(12) United States Patent
Besling et al.

(10) Patent No.: US 11,585,711 B2
(45) Date of Patent: Feb. 21, 2023

(54) CAPACITIVE PRESSURE WITH TI ELECTRODE

(71) Applicant: Sciosense B.V., AE Eindhoven (NL)

(72) Inventors: Willem Frederik Adrianus Besling, JN Eindhoven (NL); Remco Henricus Wilhelmus Pijnenburg, AE Hoogeloon (NL); Kailash Vijayakumar, KN Eindhoven (NL); Jörg Siegert, Graz (AT); Alessandro Faes, Premstätten (AT)

(73) Assignee: SCIOSENSE B.V., Ae Eindhoven (NL)

( * ) Notice: Subject to any disclaimer, the term of this patent is extended or adjusted under 35 U.S.C. 154(b) by 385 days.

(21) Appl. No.: 16/958,269

(22) PCT Filed: Jan. 10, 2019

(86) PCT No.: PCT/EP2019/050563
§ 371 (c)(1),
(2) Date: Jun. 26, 2020

(87) PCT Pub. No.: WO2019/138004
PCT Pub. Date: Jul. 18, 2019

(65) Prior Publication Data
US 2020/0340875 A1    Oct. 29, 2020

Related U.S. Application Data

(60) Provisional application No. 62/615,665, filed on Jan. 10, 2018.

(51) Int. Cl.
*G01L 9/00* (2006.01)

(52) U.S. Cl.
CPC .......... *G01L 9/0073* (2013.01); *G01L 9/0042* (2013.01)

(58) Field of Classification Search
None
See application file for complete search history.

(56) References Cited

U.S. PATENT DOCUMENTS

| 2011/0024874 | A1 | 2/2011 | Park et al. |
| 2015/0008541 | A1* | 1/2015 | Hong ................ B81C 1/00182 257/415 |
| 2016/0023893 | A1 | 1/2016 | Besling et al. |
| 2020/0348198 | A1* | 11/2020 | Besling ............ G01L 9/0073 |

* cited by examiner

*Primary Examiner* — Peter J Macchiarolo
*Assistant Examiner* — Jermaine L Jenkins
(74) *Attorney, Agent, or Firm* — Slater Matsil, LLP

(57) ABSTRACT

A capacitive sensor is disclosed. In an embodiment a semiconductor device includes a die including a capacitive pressure sensor integrated on a CMOS circuit, wherein the capacitive pressure sensor includes a first electrode and a second electrode separated from one another by a cavity, the second electrode including a suspended tensile membrane, and wherein the first electrode is composed of one or more aluminum-free layers containing Ti.

20 Claims, 8 Drawing Sheets

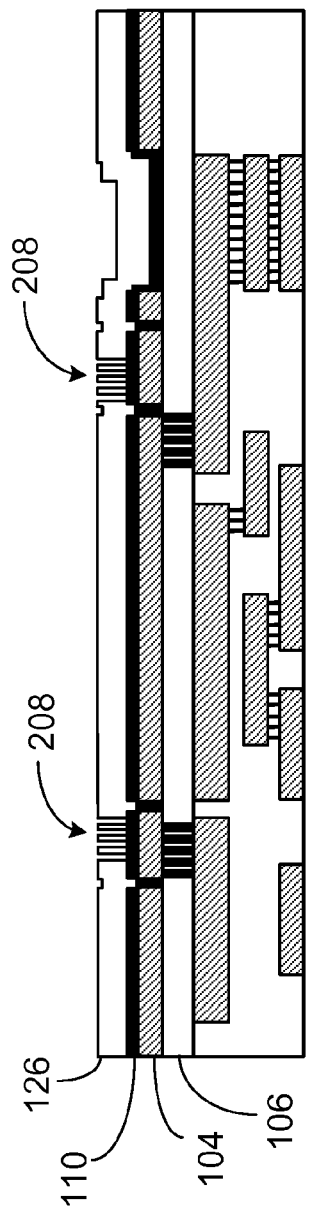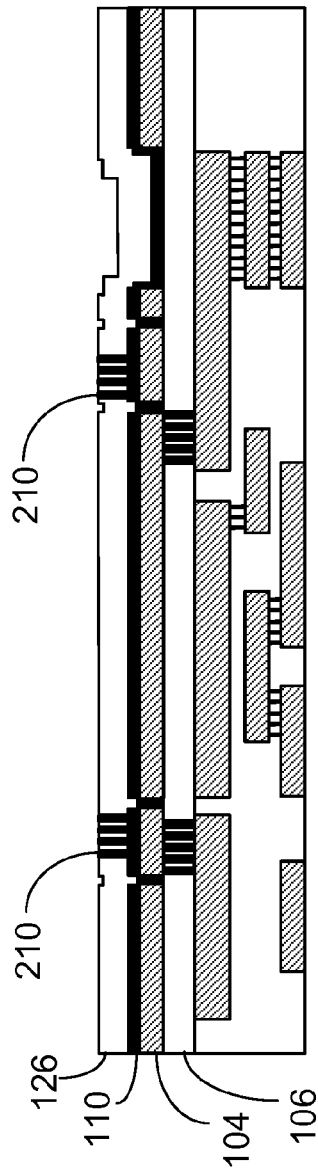
FIG. 5G
FIG. 5H

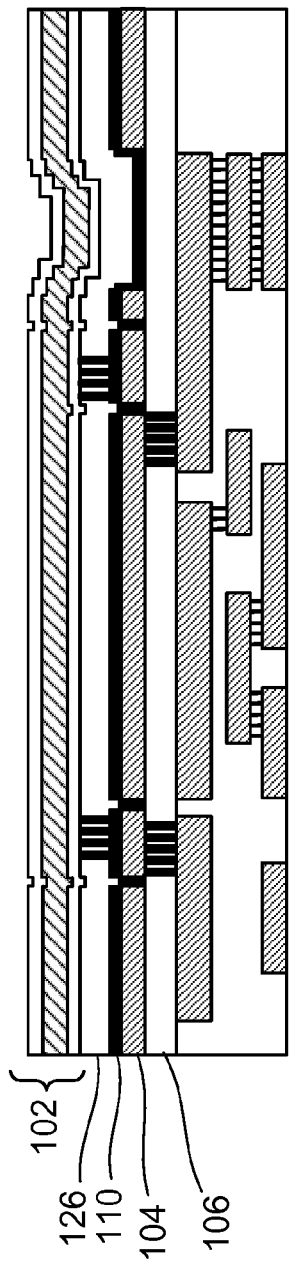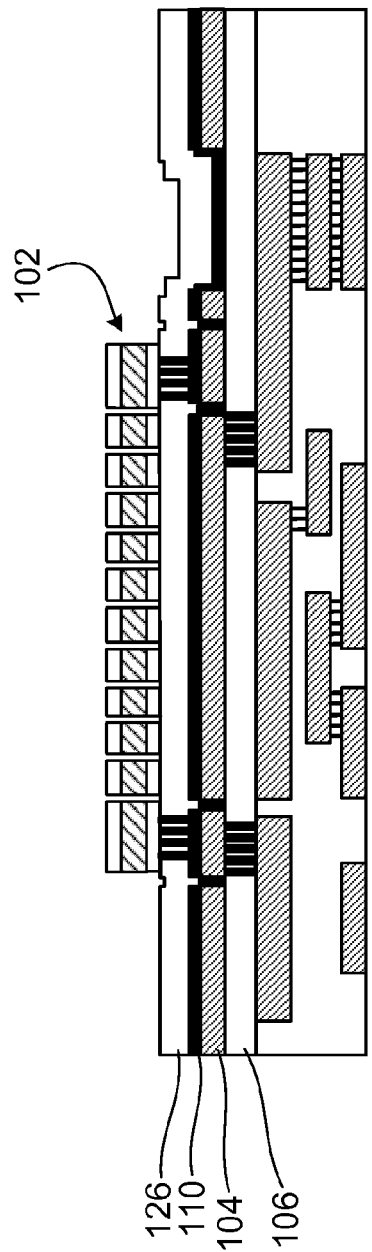

CAPACITIVE PRESSURE WITH TI ELECTRODE

This patent application is a national phase filing under section 371 of PCT/EP2019/050563, filed Jan. 10, 2019, which claims the priority of U.S. provisional patent application 62/615,665, filed Jan. 10, 2018, each of which is incorporated herein by reference in its entirety.

TECHNICAL FIELD

The present disclosure relates to capacitive pressure sensors.

BACKGROUND

Pressure sensors, such as microelectromechanical systems (MEMS) sensors, have many applications. These sensors can be used, for example, in automotive, consumer, industrial, medical, and other applications. In MEMS sensors, for example, pressure can be measured via deflection of a membrane caused by an external pressure. Large deflections or temperature differences, however, can induce significant non-linearity in the sensors, which may present challenges in a variety of applications. Accurate and repeatable manufacturing processes of membranes and pressure sensors can allow for more accurate pressure readings over a range of temperatures and pressures.

SUMMARY OF THE INVENTION

Embodiments provide a semiconductor device that includes a die including a capacitive pressure sensor integrated on a CMOS circuit. The capacitive pressure sensor includes first and second electrodes separated from one another by a cavity, wherein the second electrode includes a suspended tensile membrane. Embodiments describe improvements to the compositions of the first and second electrodes, and to methods for fabricating the semiconductor device.

For example, in accordance with one aspect, embodiments describe a semiconductor device that includes a die including a capacitive pressure sensor integrated on a CMOS circuit, wherein the capacitive pressure sensor includes first and second electrodes separated from one another by a cavity, the second electrode including a suspended tensile membrane. The first electrode preferably is composed of one or more aluminum-free layers containing Ti (i.e., either substantially pure Ti, or Ti in a covalently bonded configuration).

Embodiments further describe a method that includes depositing and patterning layers of a first electrode on a passivation layer disposed over a CMOS circuit, wherein the layers of the first electrode are composed of one or more aluminum-free layers containing Ti. The method also includes depositing a sacrificial oxide over the first electrode, depositing and patterning layers of a second electrode on the sacrificial oxide, and etching part of the sacrificial oxide to form a cavity between the first and second electrodes such that the second electrode includes a suspended tensile membrane.

Some implementations include one or more of the following features. For example, in some instances, the first electrode comprises at least one of Ti or TiN, and in some cases, consists of a Ti/TiN stack. In some implementations, the first electrode has a thickness less than 150 nm. Thus, the first electrode can include a Ti layer having a thickness in a range of 50-80 nm and/or a TiN layer having a thickness in a range of 20-100 nm. In some instances, the first electrode includes TiSiN.

In some implementations, the second electrode includes tungsten disposed on a TiN/Ti/TiN stack or on a TiSiN/Ti/TiN stack. For example, the second electrode can be implemented as a TiN/Ti/TiN/W/TiN stack or as a TiSiN/Ti/TiN/W/Ti/TiN stack. In some instances, the Ti layer in the TiN/Ti/TiN stack has a thickness of at least 50 nm.

Other aspects, features and advantages will be readily apparent from the following detailed description, the accompanying drawings and the claims.

BRIEF DESCRIPTION OF THE DRAWINGS

FIGS. 5A through 5L illustrate various steps in the fabrication of a capacitive pressure sensor disposed on top of an integrated CMOS circuit.

DETAILED DESCRIPTION OF ILLUSTRATIVE EMBODIMENTS

Embodiments describe a capacitive pressure sensor disposed on top of an integrated circuit such as an integrated CMOS read-out circuit. The capacitive pressure sensor can include a suspended membrane made of materials that allow for the fabrication of the capacitive pressure sensor on top of integrated circuits utilizing standard CMOS fabrication techniques and tools. Because the capacitive pressure sensor is formed on top of an integrated circuit, the overall footprint of a device may be reduced, as a dual die package solution is not utilized. The capacitive pressure sensor includes a lower (or first) electrode below the suspended membrane, which itself forms part of an upper (or second) electrode.

Figure 1:
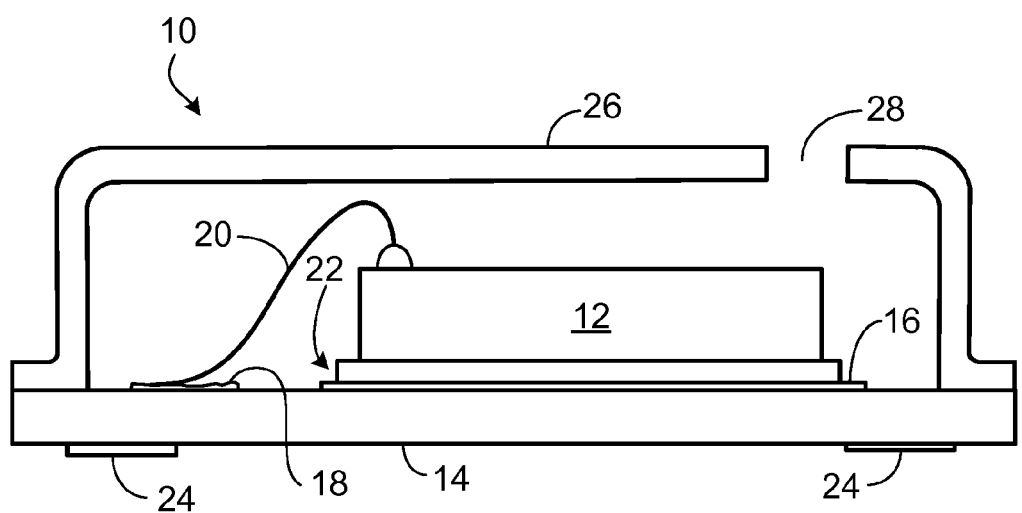
FIG. 1 illustrates an example of a package including a semiconductor die.

As shown in FIG. 1, a device package 10 includes a die (e.g., semiconductor chip) 12. In the illustrated example, the die 12 includes an application specific integrated circuit (ASIC) with an integrated capacitive pressure (e.g., MEMS) sensor. The package 10 includes a support 14 to which the die 12 is attached. The support 14 can be implemented, for example, as a single or multi-layered (e.g., laminated) substrate, whose surface facing the interior of the package 10 may include a die pad 16 and one or more bond pads 18 for electrical connections 20 to and from the integrated circuit die 12. The die 12 can be attached to the support (e.g., the die pad) 16 by an adhesive 22 (e.g., glue) present on the backside of the die 12.

The package 10 also includes one or more bonding pads 24 on its outer lower surface. The package 10 further can include a metal or other cap 26 that shields the die 12. The cap 26 can have a small opening 28 that provides access to ambient pressure. In some implementations, the cap 26 is fully closed, but the support 14 has a port to provide access to ambient pressure.

Figure 2:
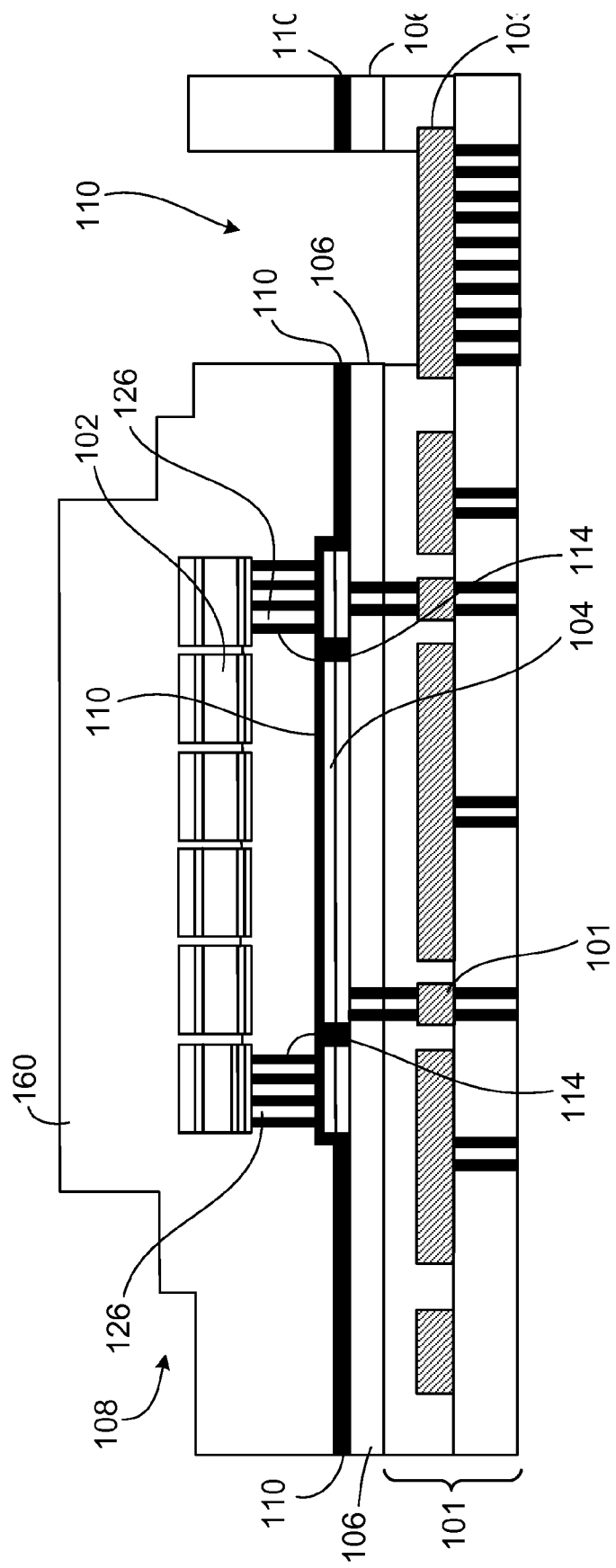
FIG. 2 illustrates an example of a die including capacitive pressure sensor.

FIG. 2 illustrates various details of an example of a capacitive pressure sensor 108 that can be integrated into the die 12. As shown in FIG. 2, the capacitive pressure sensor 108 can be formed on top of the final passivation layer 106 of a CMOS read-out circuit 101. The sensor 108 includes a cavity 112 that separates a bottom (or lower) electrode 104 from the suspended tensile membrane 102, which serves as a top (or upper) electrode. In some instances, the cavity 112 has a height of about 0.75 μm, although this can differ in other implementations. The electrode(s) and suspended membrane of the capacitive pressure sensor 108 can be connected electrically to the integrated circuit 106. Two or more anchor trenches 114 laterally surround the cavity 112, are filled with a first electrically conductive material, and are separated from one another by an oxide support layer (e.g., silicon oxide) 126. Various vias 120 may extend from the bottom electrode 104 to the CMOS top metal layer 101. The CMOS top metal layer 101 can include, among other things, a bond pad 103.

Figure 3:
FIG. 3 illustrates details of a stack for a bottom electrode.

The bottom electrode 104 is composed of one or more aluminum-free layers containing titanium (Ti) (i.e., either substantially pure Ti, or Ti in a covalently bonded configuration). For example, as shown in FIG. 3, the bottom electrode 104 preferably is a relatively thin Ti/TiN stack and is preferably deposited by physical vapor deposition (PVD). Thus, in the illustrated example, the bottom electrode consists of TiN 132 on Ti 130. In contrast to some known techniques, the bottom electrode 104 can be aluminum-free (i.e., it does not contain aluminum). Preferably, the overall thickness of the bottom electrode 104 is less than 150 nanometers (nm). For example, in many instances, the Ti layer 130 has a thickness in the range of 10-50 nm, and preferably in the range of 50-80 nm (and preferably at least 65 nm in some cases to facilitate gettering), and the TiN layer 132 has a thickness in the range of 20-100 nm. In some instances, each of the layers 130, 132 has a respective thickness in the range of 40-50 nm (e.g., about 45 nm). In some instances, the bottom electrode 104 is comprised completely of titanium (Ti) deposited by PVD. In some instances, the bottom electrode 104 is composed of titanium nitride (TiN). TiN can be deposited, for example, by PVD, chemical vapor deposition (CVD), atomic layer deposition (ALD) or plasma enhanced ALD (PE-ALD). In some instances the bottom electrode comprises titanium silicon nitride (TiSiN) deposited by CVD. In some instances, a Ti/TiSiN stack is provided for the bottom electrode 104. The Ti can help getter water and oxygen molecules present in the surrounding dielectric layers. The TiN or TiSiN cap layer on top of the underlying Ti film can help protect the Ti from oxidation during the manufacturing process.

As further shown in FIG. 2, a plasma-enhanced chemical vapor deposition (PECVD) Si-rich SiN etch stop layer 11o overlies the passivation layer 106 as well as the bottom electrode 104. In some instances, the etch stop layer 11o has a thickness on the order of about 200 nm. The etch stop layer 11o also can be comprised of PECVD SiC (silicon carbide) or PECVD SiCN (silicon carbo nitride) or ALD Al$_2$O$_3$ (aluminum oxide). A further function of the etch stop layer 11o in some instances is to provide a dielectric separation layer between the fixed bottom electrode 104 and the flexible top electrode 102.

Figure 4:
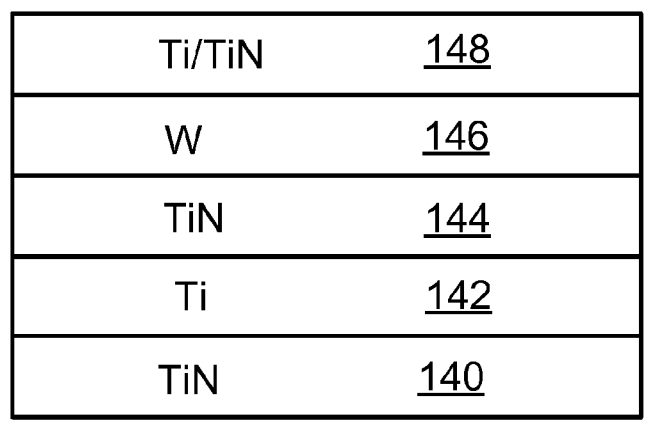
FIG. 4 illustrates details of a stack for a top electrode.

As shown in FIG. 4, in some instances, the top electrode 102 is a TiN/Ti/TiN/W/TiTiN stack. Thus, the top electrode 102 can include a TiN interface layer 140 as its bottom layer. In some instances, the interface layer 140 may be comprised of TiSiN. The interface layer 140 serves as the interface to the underlying sacrificial oxide. The following layers are disposed, in order, over the interface layer 140: a Ti layer 142, a TiN layer 144, a tungsten (W) layer 146, and Ti/TiN layers 148. Thus, the top electrode stack 102 in the illustrated example includes a Ti layer 142 sandwiched between two TiN layers 140, 144. Embedding the Ti layer 142 between the two TiN layers 140, 144 can help avoid Ti oxidation or formation of TiF fluorides during VHF etching and/or W deposition.

The Ti can help getter water and oxygen molecules present in the surrounding dielectric layers and from the cavity. The TiN or TiSiN interface layer 140 below the underlying Ti film can protect the Ti from oxidation and fluorination during the manufacturing process, e.g., during the membrane release step using vapor HF. The TiN or TiSiN interface layer 140 should be relatively thin to allow the Ti to be activated at elevated temperatures. The Ti/TiN layers 148 on top of the tungsten (W) layer 146 can help improve adhesion of the PECVD SiN sealing layer. In some instances they may be omitted.

In some instances, the TiN interface 140 has a thickness in the range of 10-50 nm (e.g., 20 nm). Examples of the thicknesses of the other layers in the top electrode 102 are as follows: Ti layer 142 (45 nm), TiN layer 144 (45 nm), a tungsten (W) layer 146 (400 nm), and Ti/TiN layers 148 (100 nm). These values may differ in other implementations. A Ti thickness smaller than 50 nm can give rise to high cavity pressures. Thus, the TiN/Ti/TiN metal stack underneath the W film preferably has a thick Ti layer sandwiched between two TiN layers. The bottom TiN layer can help avoid TiF formation during the vHF membrane release etch. The top TiN layer can help protect the Ti during CVD W deposition.

As further shown in FIG. 2, the MEMS structure including the bottom and top electrodes 104, 102 can be covered with a relatively thick (e.g., 2 μm) PECVD SiN membrane seal 160. A bond pad opening 162 is provided in the membrane seal 160 over the bond pad 103 for electrical connection to the bond pad 162.

Figure 5A:
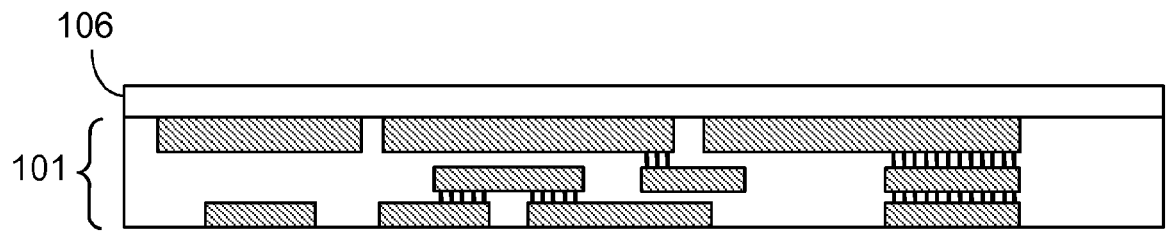
Figure 5B:
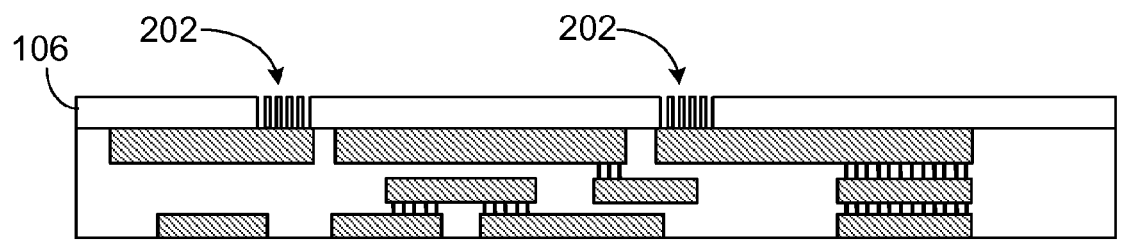
Figure 5C:
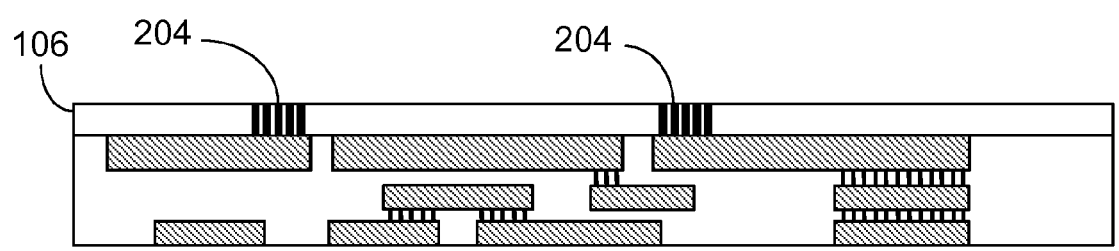
Figure 5D:
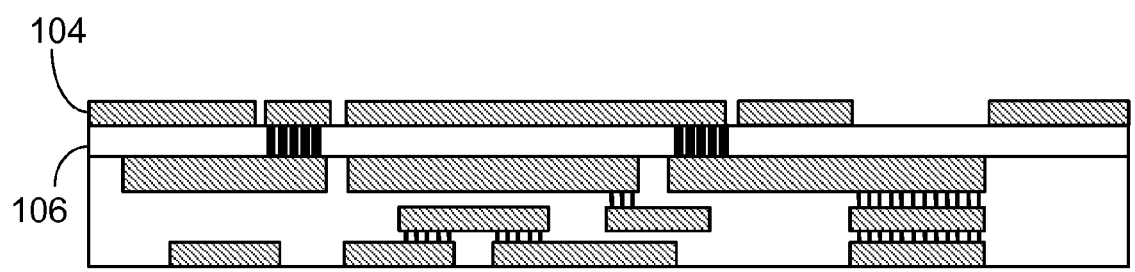

FIGS. 5A through 5L illustrate various steps in the fabrication of a capacitive pressure sensor disposed on top of an integrated CMOS read-out circuit according to some implementations. As shown in FIG. 5A, a planar passivation layer 106 composed, for example of SiO$_2$, is formed on the upper layer of an integrated CMOS read-out circuit 101. Next, as shown in FIG. 5B, vias 202 are etched through the passivation layer 106 using a first mask. The vias then are filled with a conductive material (e.g., tungsten) 204, and a CMP process is performed so as to planarize the surface (FIG. 5C). Then, the Ti/TiN layers for the bottom electrode 104 are deposited and patterned using a second mask (see FIG. 5D).

Figure 5E:
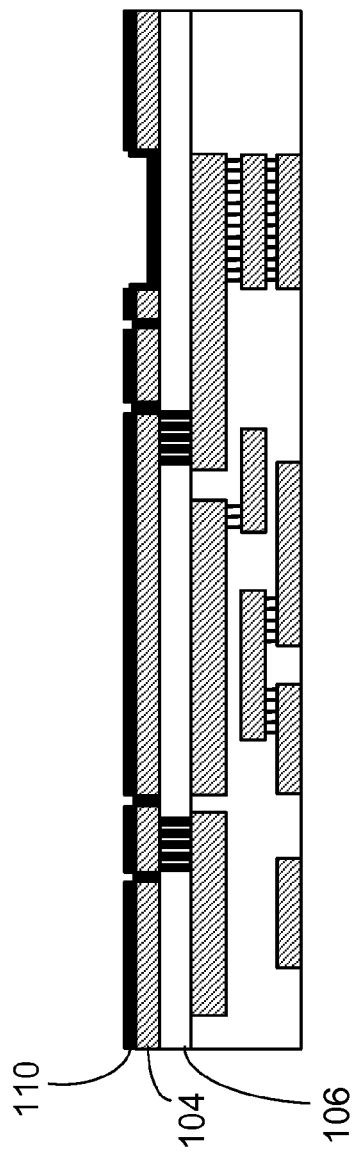
Figure 5F:
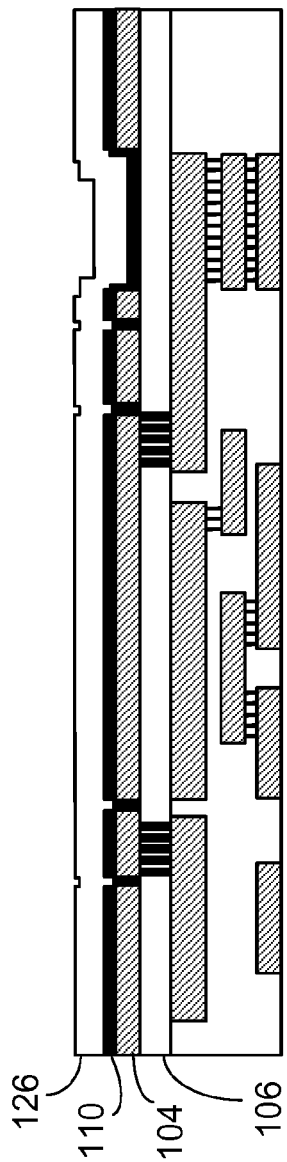

As illustrated in FIG. 5E, the etch stop layer 110 is deposited over the bottom electrode stack 104, and then the sacrificial oxide layer 26 is deposited on the upper surface of the bottom electrode stack 104, as shown in FIG. 5F. Next, as shown in FIG. 5G, vias 208 are etched through the sacrificial oxide layer 126 and through the etch stop layer 110 using a third mask. These vias then are filled with a conductive material (e.g., tungsten) 208, and a CMP process is performed so as to planarize the surface (FIG. 5H).

Figure 5K:
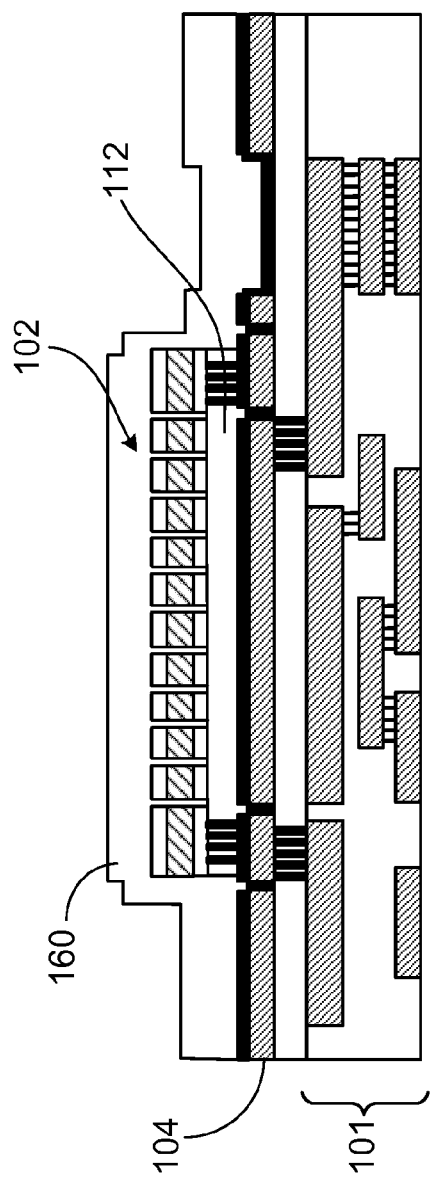
Figure 5L:
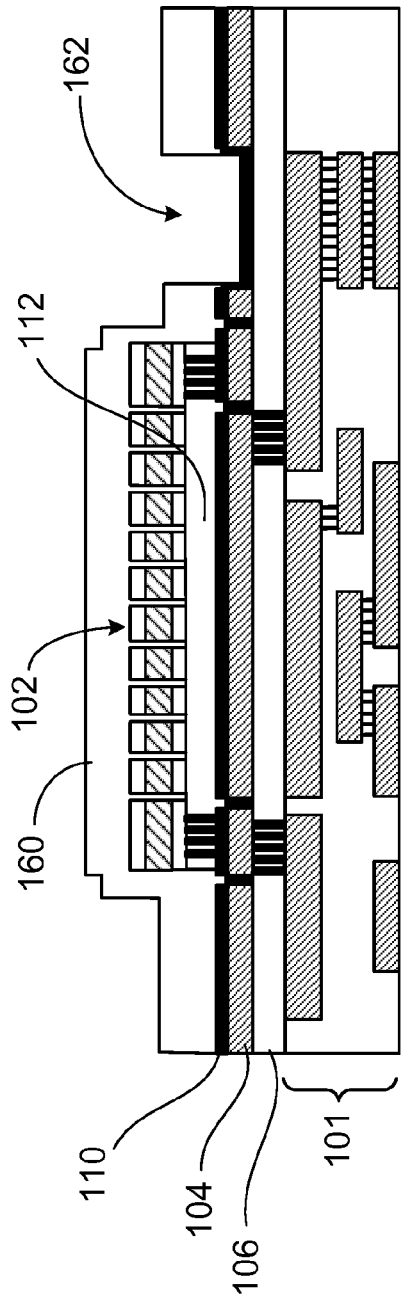

Next, as illustrated in FIG. 5I, the TiN/Ti/TiN/W/Ti/TiN layers are deposited to form the top electrode stack 102. The top electrode stack layers are patterned using a fourth mask (FIG. 5J), and part of the sacrificial oxide layer 126 is etched away to form the cavity 112 between the bottom electrode 104 and the suspended membrane that forms part of the top electrode 102 (FIG. 5K). Next, as further shown in FIG. 5K, the PECVD SiN seal 160 is deposited over the patterned top electrode stack. The bond pad opening 162 can be formed, for example, using a fifth mask.

The relatively thin bottom electrode 104 can help reduce the topography in the sacrificial oxide layer. The sacrificial oxide layer subsequently is removed to form the cavity 112.

However, the sacrificial oxide remains between the anchor trenches 114 to support the membrane and define the membrane geometry. In some implementations, using a thin bottom electrode 104 can avoid the need for a subsequent oxide chemical mechanical polishing (CMP) step to planarize the sacrificial oxide prior to patterning of the anchor(s) 114. This can improve process spread on the gap as CMP processes tend to add a lot of thickness variation within a wafer as well as wafer-to-wafer. A lower process spread can improve the overall yield/performance and can be used to give narrow spec margins for pressure range and pressure sensitivity or to improve sensitivity. Thus, the device can be designed to be operated more around the touch point pressure.

The thinner bottom electrode stack 104 also can, in some instances, improve the step coverage of the etch stop layer 110. For example, the etch stop layer 110 can be made thinner and, therefore, the sensitivity of the device can be improved.

Also, as a result of the topography of the bottom electrode 104, the overlying Si-rich SiN etch stop layer 110 has a tendency to become thinner at the sidewalls. This tends to occur because PECVD processes have a reduced coverage at the side walls. A smaller stack thickness for the bottom electrode 104 can result in a more favorable aspect ratio for the trench(es) in the bottom electrode.

Further, eliminating aluminum from the bottom electrode stack 104 can be advantageous as well. Aluminum is known to show creep at elevated temperatures, which is associated with its viscoelastic properties. Viscoelastic materials exhibit a relationship between stress and strain that is time-dependent, and they possess the following three important properties: stress relaxation (a step constant strain results in decreasing stress), creep (a step constant stress results in increasing strain), and hysteresis (a stress-strain phase lag). In MEMS devices, viscoelastic behavior can result in time-dependent output shifts that vary based on the temperature history and the mismatch in the coefficient of thermal expansion (CTE). To mitigate this behavior, rare earth metals may be added to harden the Al metal and remove the viscoelastic properties. However, these dopants usually are not available in standard CMOS fabrication facilities. Thus, for the capacitive pressure sensor 108, it desirable to remove the Al altogether. Further, Ti and TiN have CTE values much lower than Al, and thus are better suited for the capacitive pressure sensor 108.

Additional advantages can be achieved in some cases by the elimination of aluminum from the bottom electrode 104. For example, if the patterning of the bottom electrode 104 results in a non-uniform etch profile, there will be an increased likelihood of seam formation or even film discontinuities at these locations. Seams should be avoided as they may initiate cracks and will be not able to withstand vapor hydrofluoric acid (VHF) attack during the membrane release step. Thus, removing the Al from the bottom electrode stack can be advantageous because it reduces the risk on voids underneath the top TiN layer 132.

Another potential advantage of eliminating aluminum from the bottom electrode 104 relates to the bottom electrode roughness. If the Al thickness is reduced to a thickness below, e.g., 100 nm (i.e., in order to reduce the topography), the Al layer tends to become discontinuous. To avoid too large roughness or even discontinuities, the deposition temperature of the physical vapor deposition (PVD), the Al needs to be reduced to below about 200° C. Although such a temperature is feasible, it is a non-standard temperature for Al processing in a CMOS fabrication facility. Deposition of the Ti/TiN stack can, in some cases, result in much smoother films that do not tend to hillock at elevated temperatures.

The Ti layers in the bottom and top electrodes also can be advantageous for gettering purposes. Thus, in some instances, it is advantageous to provide a relatively thick Ti layer in the bottom electrode 104 as well as in the top electrode 102. For example, a relatively thick Ti layer 130 in the bottom electrode 104 can be beneficial to reduce the cavity pressure. In some implementations, by increasing the thickness of the Ti adhesion layer 130 to about 45 nm, the cavity pressure can be kept lower (e.g., below 10 mbar) and more stable over time. A stable cavity pressure is associated with the gettering capabilities of Ti. In particular, if Ti comes into contact with $H_2O$ vapor, $TiO_2$ and hydrogen gas are formed. The hydrogen gas may accumulate in the cavity 112. Hydrogen can also be gettered by the Ti itself. As hydrogen gas and water vapor are gases that are released easily from dielectric layers at elevated temperatures, it is important that these gases are either trapped or removed during the sealing process. Thus, a certain minimum amount of gettering material is desirable.

If Ti is included in the bottom electrode stack 104, the metal top electrode stack 102 need not contain a large amount of free Ti.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also can be implemented in combination in a single embodiment. Conversely, various features that are described in the context of a single embodiment also can be implemented in multiple embodiments separately or in any suitable sub-combination. Accordingly, other implementations are within the scope of the claims.

What is claimed is:

1. A semiconductor device comprising:
a die including a capacitive pressure sensor integrated on a CMOS circuit,
wherein the capacitive pressure sensor includes a first electrode and a second electrode separated from one another by a cavity, the second electrode including a suspended tensile membrane,
wherein the first electrode is composed of one or more aluminum-free layers containing Ti,
wherein at least one of the two following criteria applies:
(i) the first electrode includes TiSiN; or
(ii) the first electrode includes a Ti layer having a thickness in a range of 10-80 nm and a TiN layer having a thickness in a range of 20-100 nm.

2. The semiconductor device of claim 1, wherein the first electrode is located closer to the CMOS circuit than the second electrode.

3. The semiconductor device of claim 1, wherein the first electrode comprises at least one of Ti or TiN.

4. The semiconductor device of claim 1, wherein the first electrode consists essentially of a Ti/TiN stack.

5. The semiconductor device of claim 1, wherein the first electrode has a thickness less than 150 nm inclusive.

6. The semiconductor device of claim 1, wherein the first electrode includes the Ti layer having a thickness in a range of 50-80 nm.

7. The semiconductor device of claim 1, wherein the first electrode includes the TiN layer having a thickness in a range of 20-100 nm.

8. The semiconductor device of claim 1, wherein the first electrode includes the TiSiN.

9. The semiconductor device of claim 1, wherein the second electrode includes tungsten disposed on a TiN/Ti/TiN stack.

10. The semiconductor device of claim 9, wherein a Ti layer in the TiN/Ti/TiN stack of the second electrode has a thickness of at least 50 nm.

11. The semiconductor device of claim 9, wherein the second electrode includes a TiN/Ti/TiN/W/Ti/TiN stack.

12. The semiconductor device of claim 1, wherein the second electrode includes tungsten disposed on a TiSiN/Ti/TiN stack.

13. A semiconductor device comprising:
   a die including a capacitive pressure sensor integrated on a CMOS circuit,
   wherein the capacitive pressure sensor includes a first electrode and a second electrode separated from one another by a cavity, the second electrode including a suspended tensile membrane,
   wherein the second electrode includes tungsten disposed on a TiN/Ti/TiN stack or on a TiSiN/Ti/TiN stack, and
   wherein a Ti layer in the TiN/Ti/TiN stack or in the TiSiN/Ti/TiN stack of the second electrode has a thickness of at least 50 nm.

14. The semiconductor device of claim 13, wherein the second electrode includes a TiN/Ti/TiN/W/Ti/TiN stack or a TiSiN/Ti/TiN/W/Ti/TiN stack.

15. The semiconductor device of claim 13, wherein the second electrode is located further from the CMOS circuit than the first electrode.

16. A method comprising:
   depositing and patterning layers of a first electrode on a passivation layer disposed over a CMOS circuit, wherein the layers of the first electrode are composed of one or more aluminum-free layers containing Ti;
   depositing a sacrificial oxide over the first electrode;
   depositing and patterning layers of a second electrode on the sacrificial oxide; and
   etching part of the sacrificial oxide to form a cavity between the first and second electrodes such that the second electrode includes a suspended tensile membrane,
   wherein at least one of the two following criteria applies:
      (i) the first electrode includes TiSiN; or
      (ii) the first electrode includes a Ti layer having a thickness in a range of 10-8 nm and a TiN layer having a thickness in a range of 20-100 nm.

17. The method of claim 16, wherein the first electrode is a Ti/TiN stack.

18. The method of claim 16, wherein the first electrode includes the TiSiN.

19. The method of claim 16, wherein depositing and patterning layers of the first electrode comprises:
   depositing the Ti layer for the first electrode, the Ti layer having the thickness in the range of 10-80 nm; and
   subsequently depositing the TiN layer for the first electrode, the TiN layer having the thickness in the range of 20-100 nm.

20. The method of claim 16, wherein the layers for the second electrode include tungsten disposed on a TiN/Ti/TiN stack or on a TiSiN/Ti/TiN stack.

* * * * *

UNITED STATES PATENT AND TRADEMARK OFFICE
CERTIFICATE OF CORRECTION

PATENT NO. : 11,585,711 B2
APPLICATION NO. : 16/958269
DATED : February 21, 2023
INVENTOR(S) : Willem Frederik Adrianus Besling et al.

It is certified that error appears in the above-identified patent and that said Letters Patent is hereby corrected as shown below:

In the Claims

Claim 16, Column 8, Line 15; delete "10-8nm" and insert --10-80nm--.

Signed and Sealed this
Twenty-first Day of March, 2023

Katherine Kelly Vidal
*Director of the United States Patent and Trademark Office*